US012619912B2

(12) United States Patent
Flynn et al.

(10) Patent No.: US 12,619,912 B2
(45) Date of Patent: May 5, 2026

(54) DEVICE, COMPUTER PROGRAM AND COMPUTER-IMPLEMENTED METHOD FOR MACHINE LEARNING

(71) Applicant: Robert Bosch GmbH, Stuttgart (DE)

(72) Inventors: Hamish Flynn, Stuttgart (DE); David Reeb, Renningen (DE); Jan Peters, Seeheim-Jugenheim (DE); Melih Kandemir, Agedrup (DK)

(73) Assignee: ROBERT BOSCH GMBH, Stuttgart (DE)

( * ) Notice: Subject to any disclaimer, the term of this patent is extended or adjusted under 35 U.S.C. 154(b) by 909 days.

(21) Appl. No.: 17/858,980

(22) Filed: Jul. 6, 2022

(65) Prior Publication Data

US 2023/0037759 A1 Feb. 9, 2023

(30) Foreign Application Priority Data

Jul. 22, 2021 (DE) .................... 10 2021 207 868.0

(51) Int. Cl.
*G06N 20/00* (2019.01)
*G06F 18/211* (2023.01)

(52) U.S. Cl.
CPC ........... *G06N 20/00* (2019.01); *G06F 18/211* (2023.01)

(58) Field of Classification Search
CPC ...... G06N 20/00; G06F 18/211; G06F 18/217
See application file for complete search history.

(56) References Cited

U.S. PATENT DOCUMENTS

| | | | |
|---|---|---|---|
| 12,217,137 B1* | 2/2025 | Fakoor | G06N 20/00 |
| 2020/0034694 A1* | 1/2020 | Lacoste | G06N 7/01 |
| 2021/0065897 A1* | 3/2021 | Upadhyay | G06N 3/045 |
| 2021/0224585 A1* | 7/2021 | Schmidt | G06F 9/3836 |
| 2022/0105624 A1* | 4/2022 | Kalakrishnan | B25J 9/163 |
| 2023/0082326 A1* | 3/2023 | Abdolmaleki | G06N 3/092 |
| | | | 706/25 |

OTHER PUBLICATIONS

Amit, "Meta-Learning by Adjusting Priors Based on Extended PAC-Bayes Theory", Proceedings of the 35th International Conference on Machine Learning, Stockholm, Sweden, PMLR 80, 2018. (Year: 2018).*
Amit, "Lifelong Learning by Adjusting Priors", 2018. (Year: 2018).*

(Continued)

*Primary Examiner* — Dave Misir
(74) *Attorney, Agent, or Firm* — NORTON ROSE FULBRIGHT US LLP

(57) ABSTRACT

A device, computer program and computer-implemented method for machine learning. The method comprises providing a task comprising an action space of a multi-armed bandit problem or a contextual bandit problem and a distribution over rewards that is conditioned on actions, providing a hyperprior, wherein the hyperprior is a distribution over the action space, determining, depending on the hyperprior, a hyperposterior for that a lower bound for an expected reward on future bandit tasks has as large a value as possible, when using priors sampled from the hyperposterior, and wherein the hyperposterior is a distribution over the action space.

9 Claims, 2 Drawing Sheets

(56)                     References Cited

OTHER PUBLICATIONS

Pentina et al., "A PAC-Bayesian Bound for Lifelong Learning,"
Proceedings of the 31st International Conference on Machine
Learning, Beijing, China, JMLR: W&CP, vol. 32, 2014, pp. 1-9.
extension://elhekieabhbkpmcefcoobjddigjcaadp/http://proceedings.
mlr.press/v32/pentina14.pdf Downloaded Jul. 1, 2022.
Wang et al., "On the Global Optimality of Model-Agnostic Meta-
Learning: Reinforcement Learning and Supervised Learning," Pro-
ceedings of the 37th International Conference on Machine Learn-
ing, Online, PMLR 119, 2020, pp. 1-10.

* cited by examiner

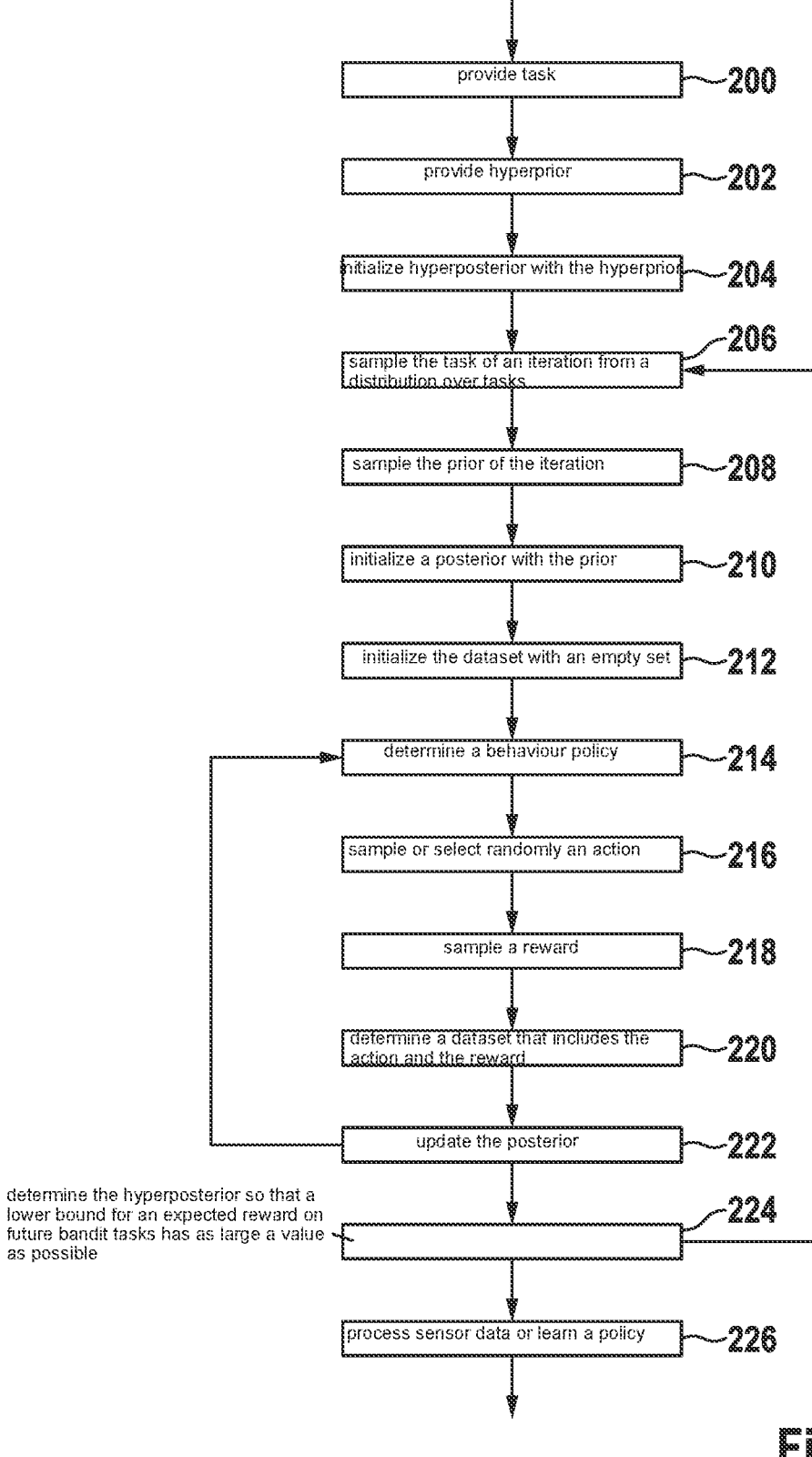

provide task ~200 provide hyperprior ~202 initialize hyperposterior with the hyperprior ~204 sample the task of an iteration from a distribution over tasks ~206 sample the prior of the iteration ~208 initialize a posterior with the prior ~210 initialize the dataset with an empty set ~212 determine a behaviour policy ~214 sample or select randomly an action ~216 sample a reward ~218 determine a dataset that includes the action and the reward ~220 update the posterior ~222 determine the hyperposterior so that a lower bound for an expected reward on future bandit tasks has as large a value as possible ~224 process sensor data or learn a policy ~226

Fig. 2

DEVICE, COMPUTER PROGRAM AND COMPUTER-IMPLEMENTED METHOD FOR MACHINE LEARNING

CROSS REFERENCE

The present application claims the benefit under 35 U.S.C. § 119 of German Patent Application No. DE 10 2021 207 868.0 filed on Jul. 22, 2021, which is expressly incorporated herein by reference in its entirety.

BACKGROUND INFORMATION

The present invention relates to a device, a computer program and a computer-implemented method for machine learning.

"A PAC-Bayesian bound for Lifelong Learning," by Anastasia Pentina, Christoph H. Lampert, arXiv: 1311.2838, describes aspects of a lifelong learning setting for machine learning.

SUMMARY

A computer-implemented method, a device and a computer program according to the present invention provide an improved machine learning, in particular based on an objective function for training a lifelong learning system.

In accordance with an example embodiment of the present invention, the computer-implemented method for machine learning comprises providing a task comprising an action space of a multi-armed bandit problem or a contextual bandit problem and a distribution over rewards that is conditioned on actions, providing a hyperprior, wherein the hyperprior is a distribution over the action space, determining, depending on the hyperprior, a hyperposterior for that a lower bound for an expected reward on future bandit tasks has as large a value as possible, when using priors sampled from the hyperposterior, and wherein the hyperposterior is a distribution over the action space. This means, that the tasks are either a multi-armed bandit or contextual bandit problem. The lower bound is a PAC-Bayesian generalisation bound that lower bounds the expected reward on the future bandit tasks when using priors sampled from a hyperposterior. The lower bound is used as objective function for a lifelong learning, in which after observing a task, the hyperposterior is updated such that it approximately maximises the lower bound. The lower bound contains observable quantities and as a result can be computed using training data from observed tasks. This way, prior knowledge from a set of observed multi-armed bandit or contextual bandit tasks is transferred to new multi-armed bandit or contextual bandit tasks.

In accordance with an example embodiment of the present invention, determining the hyperposterior may comprise determining the hyperposterior that maximises the lower bound for the expected reward. The hyperposterior that maximises the lower bound is expected to assign high probability to priors that result in low error on future tasks.

The method can be used to transfer prior knowledge from a set of observed multi-armed bandit or contextual bandit tasks to new multi-armed bandit or contextual bandit tasks. Many problems can be represented as either multi-armed bandit problems or contextual bandit problems. Therefore, the method can be used to transfer prior knowledge to many types of tasks.

In accordance with an example embodiment of the present invention, the method may comprise processing sensor data, in particular digital image data or audio data, depending on a prior sampled from the hyperposterior, in particular for classifying the sensor data, detecting the presence of objects in the sensor data or performing a semantic segmentation on the sensor data, or determining a measure for robustness of the machine learning, in particular a probability that an expected error on a next task is not above a predetermined value, when sampling priors from the hyperposterior, or detecting an anomaly in sensor data depending on a prior sampled from the hyperposterior, or learning a policy for controlling a physical system and determining a control signal for controlling the physical system depending on a prior sampled from the hyperposterior. Therefore, the method is used to transfer prior knowledge to new problems, in particular new classification problems, new robustness problems, new anomaly detection problems, and/or new control problems.

The lower bound is also a measure for robustness of the machine learning. The hyperposterior also provides information about an expected error on the next task, when priors are sampled from the hyperposterior. The expected error is for example not above a certain value, when priors are sampled from a certain hyperposterior.

In accordance with an example embodiment of the present invention, the method may comprise determining the hyperposterior in a number of iterations, and sampling the prior of an iteration from the hyperposterior of a previous iteration. Thus, in an iteration of the machine learning, prior knowledge is transferred from earlier iterations.

In accordance with an example embodiment of the present invention, the method may comprise sampling the task of the iteration from a distribution over tasks. Processing an in particular large number of different tasks improves the result of the machine learning.

In accordance with an example embodiment of the present invention, the method preferably comprises initializing the hyperposterior with the hyperprior. Any available hyperprior is a good starting point for the machine learning.

In accordance with an example embodiment of the present invention, the method may comprise initializing a posterior with the prior, determining from a set of behaviour policies of the task a behaviour policy that is associated with the task posterior, wherein the behaviour policy comprises a distribution over actions with a probability mass, sampling or selecting randomly from the probability mass an action, sampling a reward depending on the action from the distribution over rewards, determining a task dataset that includes the action and the reward, updating the task posterior to include the task dataset. This provides very efficient machine learning for multi-armed bandit or contextual bandit tasks in which the created posterior preserves the task dataset as knowledge of the previous iteration.

Providing the task preferably comprises providing the task comprising a state space and a distribution over initial states, wherein the method further comprises sampling or selecting randomly an initial state from the distribution over initial states, and wherein the distribution over rewards is conditioned on the actions and states of the state space. This provides very efficient machine learning for contextual bandit tasks.

In accordance with an example embodiment of the present invention, the method may comprise initializing the task dataset with an empty set and then updating the task posterior in a predetermined number of rounds. Thus, the lower bound is computed from training data from the observed tasks.

Determining the hyperposterior may comprise determining the lower bound depending on a Kullback-Leibler divergence of the hyperposterior and the hyperprior. The goal an improved machine learning is provided, when the prior is optimised to be as effective on an observed task as it is on a new task. The Kullback-Leibler divergence of the hyperposterior and the hyperprior provide a good way of determining the lower bound from the training data from the observed tasks.

In accordance with an example embodiment of the present invention, a device for machine learning is provided which is configured for executing steps in the method according the present invention.

A computer program is provided which comprises computer-readable instructions, that when executed on a computer, cause the computer to perform the method according to the present invention.

Further advantageous embodiments of the present invention are derivable from the description herein and the figures.

BRIEF DESCRIPTION OF THE DRAWINGS

FIG. 2 depicts steps in a method for machine learning, in accordance with an example embodiment of the present invention.

DETAILED DESCRIPTION OF EXAMPLE EMBODIMENTS

Figure 1:
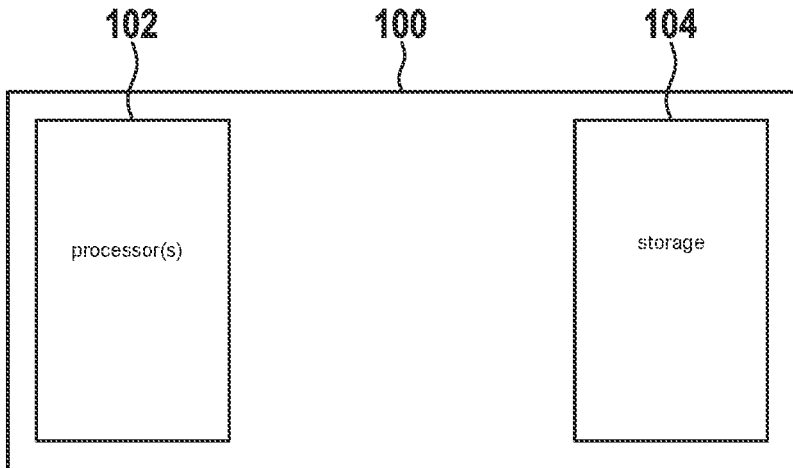
FIG. 1 schematically depicts a part of a device for machine learning, in accordance with an example embodiment of the present invention.

FIG. 1 depicts schematically a part of a device 100 for machine learning. The device 100 comprises at least one processor 102 and at least one storage 104. The at least one storage 104 may store a computer program that comprises computer-readable instructions, that when executed on a computer, cause the computer to perform a method that will be described below with reference to FIG. 2. The device 100 is configured for executing steps in the method, in particular when the at least one processor 102 executes instructions of the computer program.

The method of machine learning in the example uses a base learning algorithm $Q=Q(D,P)$ and starts with a step 200. The base learning algorithm returns a posterior distribution Q. Since the base learning algorithm uses a data set D and a prior P, the posterior is in the description written as $Q(D, P)$ to make the dependence on D and P clear.

In the step 200 the method comprises providing a task Ti.

The task Ti may be a task a multi-armed bandit problem that is represented as a couple $$T_i = (A, \rho_i)$$

comprising an action space A, i.e. a set of actions a, of the multi-armed bandit problem, and a distribution $\rho_i(r|a)$ over rewards r that is conditioned on actions a.

The task Ti may be a task a contextual bandit problem that is represented as a quadruple $$T_i = (S, A, \mu_i, \rho_i)$$

comprising an action space A, i.e. a set of actions a, and a state space S, and a distribution $\rho_i(r|s,a)$ over rewards r that is conditioned on actions a and states s, and a distribution over initial states $\mu(s)$ of the contextual bandit problem.

Rewards r are assumed to be between 0 and 1 and tasks $T_i$ are assumed to be sampled i.i.d. from an environment T.

Afterwards, a step 202 is executed.

In the step 202, the method comprises providing a hyperprior P.

The hyperprior P is a distribution over the set of possible prior distributions. Each prior distribution is a distribution over the action space A.

Afterwards, a step 204 is executed.

In the step 204, the method comprises initializing a hyperposterior Q with the hyperprior P. The hyperposterior Q is another distribution over prior distributions.

Afterwards a step 206 is executed.

In the step 206 the method comprises sampling the task Ti of an iteration i from a distribution T over tasks T.

Associated with the task $T_i$ is a set of behaviour policies $B_{ij}=(b_{i1}, \ldots, b_{im_i})$ of the task Ti comprising $m_i$ behaviour policies.

A behaviour policy $b_{ij}$ comprises for the multi-armed bandit problem a distribution over actions a with a probability mass $b_{ij}(a)$. In the example, the behaviour policy $b_{ij}$ is a distribution over actions a that depends in the iteration i on previously observed training data $$D_1, \ldots, D_{1-i}, D_i^{:j-1}$$

where for the in the multi-armed bandit task $$D_i^{:j-1} = ((a_{i1}, r_{i1}), \ldots, (a_{ij-1}, r_{ij-1}))$$

The elements of the training dataset are in the multi-armed bandit task distributed as follows:

$$a_{ij} \sim b_{ij}(a \mid D_1, \ldots, D_{1-i}, D_i^{:j-1}), r_{ij} \sim p_i(r \mid a_{ij})$$

A behaviour policy $b_{ij}$ comprises for the contextual bandit problem a distribution over actions a conditions on states s with a probability mass $b_{ij}(a|s_{ij})$. In the example, the behaviour policy $b_{ij}$ is a distribution over actions a that depends in the iteration i on previously observed training data $$D_i^{:j-1} = ((s_{i1}, a_{i1}, r_{i1}), \ldots, (s, a_{ij-1}, r_{ij-1}))$$

The elements of the training dataset are in the contextual bandit task distributed as follows $$a_{ij} \sim b_{ij}(a \mid s_{ij}, D_1, \ldots, D_{1-i}, D_i^{:j-1}), r_{ij} \sim p_i(r \mid s_{ij}, a_{ij})$$

Afterwards a step 208 is executed.

In step 208, the method comprises sampling the prior P of the iteration i from the hyperposterior Q of a previous iteration i−1.

Afterwards, a step 210 is executed.

In the step 210, the method comprises initializing a posterior Q with the prior P.

Afterwards, a step 212 is executed.

In the step 212, the method comprises initializing the dataset $D_i$ with an empty set.

Afterwards, a step 214 is executed.

In the step 214, the method comprises determining from the set of behaviour policies $B_{ij}$ of the task $T_i$ a behaviour policy $b_{ij}$ that is associated with the task posterior Q.

Afterwards, a step 216 is executed.

In the step 216, the method comprises sampling or selecting randomly from the probability mass of the behaviour policy $b_{ij}$ an action $a_{ij}$.

Afterwards, a step 218 is executed.

In the step 218, the method comprises for the multi-armed bandit problem sampling a reward $r_{ij}$ depending on the action $a_{ij}$ from the distribution $\rho_i(r|a)$ over rewards r.

In the step 218, the method comprises for the contextual bandit problem sampling or selecting randomly an initial state $s_{ij}$ from the distribution over initial states $\mu(s)$ and sampling the reward $r_{ij}$ depending on the action $a_{ij}$ from the distribution $\rho_i(r|s, a))$ over rewards r that is conditioned on the actions a and states s of the state space S.

Afterwards, a step 220 is executed.

In the step 220, the method comprises, determining a dataset $D_i$ that includes the action aij and the reward rij.

The dataset $D_i$ is a training set that for the multi-armed bandit problem comprises $m_i$ observable training data pairs:

$$D_i = \left( (a_{i1}, r_{i1}), \dots , (a_{im_i}, r_{im_i}) \right)$$

The dataset $D_i$ is a training set that for the contextual bandit problem comprises $m_i$ observable training data triple:

$$D_i = ((s_{i1}, a_{i1}, r_{i1}), \dots , (s, a_{ij-1}, r_{ij-1}))$$

Afterwards, a step 222 is executed.

In the step 222, the method comprises, updating the posterior Q to include the dataset $D_i$.

To this end, the deterministic base learning algorithm takes the dataset $D_i$ and the prior P as inputs and produces the posterior $Q=Q(D_i; P)$.

The goal of the task $T_i$ is to find a posterior Q that maximises an expected reward. The expected reward for the multi-armed bandit problem is:

$$L_i(a) = \mathop{E}_{r \sim \rho_i(r|a)}[r]$$

wherein E is the expectancy value.

Using the dataset $D_i$, the expected reward is estimated in the example for the multi-armed bandit problem as:

$$\hat{L}_i(a, D_i) = \frac{1}{m_i} \sum_{j=1}^{m_i} \frac{1}{b_{ij}(a_{ij})} r_{ij} I\{a_{ij} = a\}$$

$I\{a_{ij}=a\}$ is an indicator function that returns 1 if $a_{ij}=a$ and 0 otherwise. The expected reward for the contextual bandit problem is:

$$L_i^{(cb)}(\pi) = \mathop{E}_{s \sim \mu_i} \mathop{E}_{a \sim \pi(a|s)} \mathop{E}_{r \sim \rho_i(r|s,a)}[r]$$

wherein E is the respective expectancy value, and wherein the prior P and the posterior Q are distributions over a space $\Pi$ of policies, wherein $\pi \in \Pi$ is a distribution $\pi(a|s)$ over actions a conditioned on states s.

Using the dataset $D_i$, the expected reward is estimated in the example for the contextual bandit problem as:

$$\hat{L}_i^{(cb)}(\pi, D_i) = \frac{1}{m_i} \sum_{j=1}^{m_i} \frac{\pi(a_{ij} \mid s_{ij})}{b_{ij}(a_{ij} \mid s_{ij})} r_{ij}$$

In the example, the method comprises updating the posterior Q in a predetermined number of rounds m. This means, the method continues with step 214 for m rounds.

Afterwards a step 224 is executed.

In the step 224, the method comprises determining, depending on the hyperprior P, the hyperposterior Q for that a lower bound for an expected reward L on future bandit tasks has as large a value as possible, when using priors P sampled from the hyperposterior Q.

Determining the hyperposterior Q in the example comprises determining the hyperposterior Q that maximises the lower bound for the expected reward L.

$$Q \leftarrow \mathrm{argmax}_Q, \text{lower bound } (L(Q'))$$

In the example, the function lower bound (L(Q')) for the multi-armed bandit problem is one of the following objective functions:

$$LIKL_a(Q) = -\frac{1}{\sqrt{n}}\left( D_{KL}(Q\|P) + \frac{1}{8} -\ln\left(\frac{\delta}{2}\right) \right) +$$

$$\frac{1}{\kappa_{max}} \mathrm{kl}_-^{-1}\left( \frac{1}{n}\sum_{i=1}^{n} \kappa_i \hat{L}_i \left( Q(D_i) \left\| \frac{D_{KL}(Q\|P) + \sum_{i=1}^{n} D_{KL}(Q(D_i, P_i)\|P_i) + n \ln(\xi(m)) - \ln(\delta/2)}{nm} \right.\right)\right)$$

$$LIKL_b(Q) = -\frac{1}{\sqrt{8n}}\left( \frac{D_{KL}(Q\|P)}{\sqrt{-\ln(\delta/2)}} + \sqrt{8} + 2\sqrt{-\ln(\delta/2)} \right) +$$

-continued $$\frac{1}{\kappa_{max}}\mathrm{kl}_-^{-1}\left(\frac{1}{n}\sum_{i=1}^{n}\kappa_i\hat{L}_i(Q(D_i, P_i), D_i)\left\|\frac{D_{KL}(Q\|P) + \sum_{i=1}^{n}D_{KL}(Q(D_i, P_i)\|P_i) + n\ \ln(\xi(m))-\ln(\delta/2)}{nm}\right.\right)$$

$$LP_a(Q) = \frac{1}{n}\sum_{i=1}^{n}\frac{\kappa_i}{\kappa_{max}}\hat{L}_i(Q_i(D_i, P_i), D_i)-\frac{1}{\sqrt{n}}\left(D_{KL}(Q\|\mathcal{P}) + \frac{1}{8} -\ln\left(\frac{\delta}{2}\right)\right)-$$

$$\frac{D_{KL}(Q\|P) + \sum_{i=1}^{n}D_{KL}(Q(D_i, P_i)\|P_i) + n\ \ln(\xi(m))-\ln(\delta/2)}{\kappa_{max}\sqrt{2nm}}$$

$$LP_b(Q) = \frac{1}{n}\sum_{i=1}^{n}\frac{\kappa_i}{\kappa_{max}}\hat{L}_i(Q_i(D_i, P_i), D_i)-\frac{1}{\sqrt{8n}}$$

$$\left(\frac{D_{KL}(Q\|P)}{\sqrt{-\ln(\delta/2)}} + \sqrt{8} + 2\sqrt{-\ln(\delta/2)}\right)-\frac{D_{KL}(Q\|P) + \sum_{i=1}^{n}D_{KL}(Q(D_i, P_i)\|P_i) + n\ \ln(\xi(m))-\ln(\delta/2)}{\kappa_{max}\sqrt{2nm}}$$

$$LHA_a(Q) = \frac{1}{n}$$

$$\sum_{i=1}^{n}\hat{L}_i(Q_i(D_i, P_i), D_i)-\frac{1}{\sqrt{n}}\left(D_{KL}(Q\|\mathcal{P}) + \frac{1}{8}-\ln\left(\frac{\delta}{2}\right)\right)-\frac{\beta}{n}\left(\frac{D_{KL}(Q\|P) + \sum_{i=1}^{n}D_{KL}(Q(D_i, P_i)\|P_i)}{\sqrt{\ln(\delta/2)}} + 2\sqrt{-\ln\left(\frac{\delta}{2}\right)}\right)$$

$$LHA_b(Q) = \frac{1}{n}\sum_{i=1}^{n}\hat{L}_i(Q_i(D_i, P_i), D_i)-\frac{1}{\sqrt{8n}}$$

$$\left(\frac{D_{KL}(Q\|P)}{\sqrt{-\ln(\delta/2)}} + \sqrt{8} -2\sqrt{-\ln(\delta/2)}\right)-\frac{\beta}{n}\left(\frac{D_{KL}(Q\|P) + \sum_{i=1}^{n}D_{KL}(Q(D_i, P_i)\|P_i)}{\sqrt{-\ln(\delta/2)}} + 2\sqrt{-\ln\left(\frac{\delta}{2}\right)}\right)$$

$$CLIKL_a(Q) = -\frac{\beta_1}{\sqrt{n}}\left(D_{KL}(Q\|\mathcal{P}) + \frac{1}{8} - \ln\left(\frac{\delta}{2}\right)\right)+$$

$$\frac{1}{\kappa_{max}}\mathrm{kl}_-^{-1}\left(\frac{1}{n}\sum_{i=1}^{n}\kappa_i\hat{L}_i(Q(D_i, P_i), D_i)\left\|\beta_2\frac{D_{KL}(Q\|P) + \sum_{i=1}^{n}D_{KL}(Q(D_i, P_i)\|P_i) + n\ \ln(\xi(m))-\ln(\delta/2)}{nm}\right.\right)$$

$$CLIKL_b(Q) = -\frac{\beta_1}{\sqrt{8n}}\left(\frac{D_{KL}(Q\|P)}{\sqrt{-\ln(\delta/2)}} + \sqrt{8} + 2\sqrt{-\ln(\delta/2)}\right)+$$

$$\frac{1}{\kappa_{max}}\mathrm{kl}_-^{-1}\left(\frac{1}{n}\sum_{i=1}^{n}\kappa_i\hat{L}_i(Q(D_i, P_i), D_i)\left\|\beta_2\frac{D_{KL}(Q\|P) + \sum_{i=1}^{n}D_{KL}(Q(D_i, P_i)\|P_i) + n\ \ln(\xi(m))-\ln(\delta/2)}{nm}\right.\right)$$

$$CLP_a(Q) = \frac{1}{n}\sum_{i=1}^{n}\frac{\kappa_i}{\kappa_{max}}\hat{L}_i(Q_i(D_i, P_i), D_i)-\frac{\beta_1}{n}$$

$$\left(D_{KL}(Q\|\mathcal{P}) + \frac{1}{8} -\ln\left(\frac{\delta}{2}\right)\right)-\frac{D_{KL}(Q\|P) + \sum_{i=1}^{n}D_{KL}(Q(D_i, P_i)\|P_i) + n\ \ln(\xi(m))-\ln(\delta/2)}{\kappa_{max}\sqrt{2nm}}$$

$$CLP_b(Q) = \frac{1}{n}\sum_{i=1}^{n}\frac{\kappa_i}{\kappa_{max}}\hat{L}_i(Q_i(D_i, P_i), D_i)-\frac{\beta_1}{\sqrt{8n}}$$

-continued $$\left(\frac{D_{KL}(Q\|P)}{\sqrt{-\ln(\delta/2)}} + \sqrt{8} + 2\sqrt{-\ln(\delta/2)}\right) - \frac{D_{KL}(Q\|P) + \sum_{i=1}^{n} D_{KL}(Q(D_i, P_i)\|P_i) + n\ \ln(\xi(m)) - \ln(\delta/2)}{\kappa_{max}\sqrt{2nm}}$$

$$CLHA_a(Q) = \frac{1}{n}\sum_{i=1}^{n}\hat{L}_i(Q_i(D_i, P_i), D_i) - \frac{\beta_1}{\sqrt{n}}$$

$$\left(D_{KL}(Q\|P) + \frac{1}{8} - \ln\left(\frac{\delta}{2}\right)\right) - \frac{\beta_2\beta}{n}\left(\frac{D_{KL}(Q\|P) + \sum_{i=1}^{n} D_{KL}(Q(D_i, P_i)\|P_i)}{\sqrt{-\ln(\delta/2)}} + 2\sqrt{-\ln\left(\frac{\delta}{2}\right)}\right)$$

$$CLHA_b(Q) = \frac{1}{n}\sum_{i=1}^{n}\hat{L}_i(Q_i(D_i, P_i), D_i) - \frac{\beta_1}{\sqrt{8n}}$$

$$\left(\frac{D_{KL}(Q\|P)}{\sqrt{-\ln(\delta/2)}} + \sqrt{8} + 2\sqrt{-\ln(\delta/2)}\right) - \frac{\beta_2\beta}{n}\left(\frac{D_{KL}(Q\|P) + \sum_{i=1}^{n} D_{KL}(Q(D_i, P_i)\|P_i)}{\sqrt{-\ln(\delta/2)}} + 2\sqrt{-\ln\left(\frac{\delta}{2}\right)}\right)$$

wherein, $\beta_1$ and $\beta_1$ are constants $0\le\beta_1,\beta_2\le1$, wherein $$\varepsilon(m) = \sum_{k=0}^{m}\binom{m}{k}\left(\frac{k}{m}\right)^{k}\left(1 - \frac{k}{m}\right)^{m-k}$$

and wherein $0<\delta\le1$ is a confidence parameter, so that for the multi-armed bandit problem the following inequalities each hold with probability $1-\delta$ over the training data $D_1, \ldots, D_n$ and the posteriors $Q_1, \ldots, Q_n$:

$$\frac{1}{n}\sum_{i=1}^{n}L_i(Q_i) \ge \frac{1}{\kappa_{max}}kl^{-1}\left(\frac{1}{n}\sum_{i=1}^{n}\kappa_i\hat{L}_i(Q_i, D_i)\left\|\frac{D_{KL}(Q^n\|P^n) + n\ln(\varepsilon(m)) - \ln(\delta)}{nm}\right.\right)$$

$$\frac{1}{n}\sum_{i=1}^{n}L_i(Q_i) \ge$$

$$\frac{1}{n}\sum_{i=1}^{n}\frac{\kappa_i}{\kappa_{max}}\hat{L}_i(Q_i, D_i) - \frac{1}{\kappa_{max}\sqrt{2nm}}\sqrt{D_{KL}(Q^n\|P^n) + n\ln(\varepsilon(m)) - \ln(\delta)}$$

wherein $Q^n$ denotes the joint distribution over actions $a_1, \ldots, a_n$ where $a_i\sim Q_i$ and wherein $P^n$ denotes the joint distribution over actions $a_1, \ldots, a_n$ where $a_i\sim P_i$ and wherein $$\kappa_i = \min_{a\in A, j=1,\ldots,m}(b_{ij}(a)) \text{ and } \kappa_{max} = \max_i \kappa_i,$$

and wherein $$\beta = \sqrt{\frac{1}{8}\sum_{i=1}^{n}\frac{1}{m_i^2}\sum_{j=1}^{m_i}\frac{1}{(\kappa_{i,j})^2}}$$

wherein $\kappa_{i,j} = \min_{a\in A, j=1,\ldots,m_i}(b_{ij}(a))$ wherein $m_i$ is the number of training set samples for task i.

For the contextual bandit problem, these objective functions may be applied by replacing $L_i$ with $L_i^{(cb)}$ and $\hat{L}_i$ with $\vec{L}_i^{(cb)}$, wherein $Q_i$ and $P_i$ are distributions over policies $\pi_i$ rather than actions $a_i$ and let $$\kappa_i = \min_{a\in A, j=1,\ldots,m}(b_{ij}(a\,|\,s_{ij}))/\pi_{max}$$

where $\pi_{max}$ is the maximum possible probability mass for any policy $\pi$ and any action state.

The performance of a hyperposterior Q is for example measured by a marginal transfer reward, which is the expected reward on a new task $T_{n+1}$, when using the base learning algorithm $Q(D_{n+1}; P)$ equipped with a prior $P\sim Q$.

For the multi-armed bandit problem the marginal transfer reward is:

$$L(Q) = \underset{P\sim Q}{E}\left[\underset{(T_{n+1}, D_{n+1})}{E}[L_{n+1}(Q(D_{n+1}, P))]\right]$$

For the contextual bandit problem the marginal transfer reward is:

$$L^{(cb)}(Q) = \underset{P\sim Q}{E}\left[\underset{(T_{n+1}, D_{n+1})}{E}\left[L_{n+1}^{(cb)}(Q(D_{n+1}, P))\right]\right]$$

with the above functions, instead of maximising the marginal transfer reward, the method maximises PAC-Bayesian lower bounds on the marginal transfer reward. Some of the bounds contain the inverse of the binary Kullback-Leibler, KL, divergence.

This means, that determining the hyperposterior Q comprises determining and approximation of the expected reward L depending on a Kullback-Leibler divergence DKL $(Q\|P)$ of the hyperposterior Q and the hyperprior P.

The hyperposterior Q is determined in the example in a number n of iterations i.

This means, the method continues with step 206 for n iterations. Afterwards, optionally, a step 226 is executed.

In the step 226, the method comprises in the example, processing sensor data, in particular digital image data or audio data, depending on a prior sampled from the hyperposterior Q. The sensor may be a microphone, a video, radar, LiDAR, ultrasonic, motion, thermal image, or sonar sensor.

The sensor data is for example processed for classifying the sensor data, detecting the presence of objects in the sensor data or performing a semantic segmentation on the sensor data. The sensor data classification is for example framed as a contextual bandit problem. The images may be classified for example regarding presence or absence or type of traffic signs, road surfaces, pedestrians, vehicles.

Instead, or additionally, the step 226 may comprise learning a policy for controlling a physical system and determining a control signal for controlling the physical system depending on a prior sampled from the hyperposterior Q.

By way of example, a probability that an expected error on a next task is not above a predetermined value may be determined, when sampling priors from the hyperposterior Q.

Instead, or additionally, the step 226 may comprise determining a measure for robustness of the machine learning. In the example, the measure for robustness is an expected error, for priors that are sampled from the hyperposterior Q.

A prior may be used for processing the sensor data e.g. when the expected error is less than a threshold and otherwise, another prior may be sampled for processing the sensor data or determining the control signal.

Instead, or additionally, the step 226 may comprise detecting an anomaly in sensor data depending on a prior sampled from the hyperposterior Q. In this aspect, an anomaly detection problem is framed as a multi-armed bandit problem.

Afterwards, the method ends in the example.

An example for the steps taken by the computer in the method for machine learning of multi-armed bandit problems is provided below:

---

Algorithm 1 PAC-Bayesian Lifelong MABs

---

1:    Input: Task distribution $\mathcal{T}$, base learning algorithm $\mathcal{Q} = \mathcal{Q}$ (D, P), hyperprior $\mathcal{P}$ 2:    Initialise hyperposterior $\mathcal{Q} \leftarrow \mathcal{P}$ 3:    for i = 1 to n do 4:      Sample task $T_i \sim \mathcal{T}$ 5:      Sample price P $P \sim \mathcal{Q}$ 6:      Initialise task posterior Q ← P 7:      Initialise task dataset $D_i$ ← ( )

8:      for j = 1 to m do

9:        Get behaviour policy $b_{ij}$ ← B(Q)

10:        Sample $a_{ij} \sim b_{ij}(a)$ and $r_{ij} \sim p_i(r|a_{ij})$

11:        Append $(a_{ij}, r_{ij})$ to $D_i$

12:        Update task posterior Q ← Q($D_i$, P)

13:      end for

14:      $\mathcal{Q} \leftarrow \mathrm{argmax}_{\mathcal{Q}}$ , (lower bound ($\mathcal{L}(\mathcal{Q}')$))

15:    end for

---

What is claimed is:

1. A computer-implemented method for machine learning, the method comprising the following steps:
providing a task including an action space of a multi-armed bandit problem or a contextual bandit problem and a distribution over rewards that is conditioned on actions;
providing a hyperprior, wherein the hyperprior is a distribution over the action space;
initializing a posterior with a prior;

determining from a set of behavior policies of the task a behavior policy that is associated with the task posterior, wherein the behavior policy includes a distribution over actions with a probability mass;
sampling or selecting randomly from the probability mass an action;
sampling a reward depending on the action from the distribution over rewards;
determining a task dataset that includes the action and the reward;
updating the posterior to include the determined task dataset;
determining, depending on the hyperprior, a hyperposterior so that a lower bound for an expected reward on future bandit tasks is maximized, when using priors sampled from the hyperposterior, wherein the hyperposterior is a distribution over the action space;
processing sensor data including digital image data or audio data, depending on a prior sampled from the hyperposterior, for classifying the sensor data; and
(i) detecting presence of objects in the sensor data, or (ii) performing a semantic segmentation on the sensor data, or (iii) determining a measure for robustness of the machine learning including a probability that an expected error on a next task is not above a predetermined value, when sampling priors from the hyperposterior, or (iv) detecting an anomaly in sensor data depending on a prior sampled from the hyperposterior, or (v) learning a policy for controlling a physical system and determining a control signal for controlling the physical system depending on a prior sampled from the hyperposterior.

2. The method according to claim 1, further comprising:
determining the hyperposterior in a number of iterations; and
sampling a prior of an iteration from the hyperposterior of a previous iteration.

3. The method according to claim 2, further comprising:
sampling the task of the iteration from a distribution over tasks.

4. The method according to claim 1, further comprising:
initializing the hyperposterior with the hyperprior.

5. The method according to claim 1, wherein the providing the task includes providing the task including a state space and a distribution over initial states, and wherein the method further comprises sampling or selecting randomly an initial state from the distribution over initial states, and wherein the distribution over rewards is conditioned on the actions and states of the state space.

6. The method according to claim 1, the method further comprising:
initializing the task dataset with an empty set and then updating the posterior in a predetermined number of rounds.

7. The method according to claim 1, wherein the determining of the hyperposterior includes determining an approximation of an expected reward depending on a Kullback-Leibler divergence of the hyperposterior and the hyperprior.

8. A device for machine learning, the device configured to:
provide a task including an action space of a multi-armed bandit problem or a contextual bandit problem and a distribution over rewards that is conditioned on actions;
provide a hyperprior, wherein the hyperprior is a distribution over the action space;
initialize a posterior with a prior;

determine from a set of behavior policies of the task a behavior policy that is associated with the task posterior, wherein the behavior policy includes a distribution over actions with a probability mass;

sample or select randomly from the probability mass an action;

sample a reward depending on the action from the distribution over rewards;

determine a task dataset that includes the action and the reward;

update the posterior to include the determined task dataset;

determine, depending on the hyperprior, a hyperposterior so that a lower bound for an expected reward on future bandit tasks is maximized, when using priors sampled from the hyperposterior, wherein the hyperposterior is a distribution over the action space;

process sensor data including digital image data or audio data, depending on a prior sampled from the hyperposterior, for classifying the sensor data; and (i) detect presence of objects in the sensor data, or (ii) perform a semantic segmentation on the sensor data, or (iii) determine a measure for robustness of the machine learning including a probability that an expected error on a next task is not above a predetermined value, when sampling priors from the hyperposterior, or (iv) detect an anomaly in sensor data depending on a prior sampled from the hyperposterior, or (v) learn a policy for controlling a physical system and determining a control signal for controlling the physical system depending on a prior sampled from the hyperposterior.

9. A non-transitory computer-readable medium on which is stored a computer program including computer-readable instructions for machine learning, the instructions, when executed by a computer, causing the computer to perform the following steps:

providing a task including an action space of a multi-armed bandit problem or a contextual bandit problem and a distribution over rewards that is conditioned on actions;

providing a hyperprior, wherein the hyperprior is a distribution over the action space;

initializing a posterior with a prior;

determining from a set of behavior policies of the task a behavior policy that is associated with the task posterior, wherein the behavior policy includes a distribution over actions with a probability mass;

sampling or selecting randomly from the probability mass an action;

sampling a reward depending on the action from the distribution over rewards;

determining a task dataset that includes the action and the reward;

updating the posterior to include the determined task dataset;

determining, depending on the hyperprior, a hyperposterior so that a lower bound for an expected reward on future bandit tasks is maximized, when using priors sampled from the hyperposterior, wherein the hyperposterior is a distribution over the action space;

processing sensor data including digital image data or audio data, depending on a prior sampled from the hyperposterior, for classifying the sensor data; and (i) detecting presence of objects in the sensor data, or (ii) performing a semantic segmentation on the sensor data, or (iii) determining a measure for robustness of the machine learning including a probability that an expected error on a next task is not above a predetermined value, when sampling priors from the hyperposterior, or (iv) detecting an anomaly in sensor data depending on a prior sampled from the hyperposterior, or (v) learning a policy for controlling a physical system and determining a control signal for controlling the physical system depending on a prior sampled from the hyperposterior.

* * * * *